(12) United States Patent
Lou et al.

(10) Patent No.: US 10,764,364 B2
(45) Date of Patent: Sep. 1, 2020

(54) LIVE MIGRATION OF PARTITIONS

(71) Applicant: MICROSOFT TECHNOLOGY LICENSING, LLC, Redmond, WA (US)

(72) Inventors: Yongfu Lou, Redmond, WA (US); Arild Einar Skjolsvold, Kenmore, WA (US); Qiuhan Wang, Redmond, WA (US); Donglin Wei, Redmond, WA (US); Maneesh Sah, Sammamish, WA (US); Jegan Devaraju, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 57 days.

(21) Appl. No.: 15/988,533

(22) Filed: May 24, 2018

(65) Prior Publication Data

US 2019/0364105 A1 Nov. 28, 2019

(51) Int. Cl.
*G06F 13/00* (2006.01)
*H04L 29/08* (2006.01)

(52) U.S. Cl.
CPC ...... *H04L 67/1095* (2013.01); *H04L 67/2842* (2013.01)

(58) Field of Classification Search
CPC .................. H04L 67/1095; H04L 67/2842
USPC ................ 709/201, 203, 227–229, 217–222; 718/105, 104, 100–102
See application file for complete search history.

(56) References Cited

U.S. PATENT DOCUMENTS

| 6,772,161 | B2 * | 8/2004 | Mahalingam | ......... G06F 16/119 |
| 6,775,672 | B2 * | 8/2004 | Mahalingam | ......... G06F 16/119 |
| 6,775,673 | B2 * | 8/2004 | Mahalingam | ....... H04L 67/1095 |
| 9,483,542 | B2 * | 11/2016 | Marsden | ............... G06F 16/275 |
| 10,311,027 | B2 * | 6/2019 | Marsden | ................. H04L 69/40 |
| 2003/0115434 | A1 * | 6/2003 | Mahalingam | ....... H04L 67/1095 711/165 |
| 2003/0115438 | A1 * | 6/2003 | Mahalingam | ......... G06F 16/119 712/1 |
| 2003/0115439 | A1 * | 6/2003 | Mahalingam | ......... G06F 16/119 712/1 |

(Continued)

*Primary Examiner* — Kenneth R Coulter
(74) *Attorney, Agent, or Firm* — Shook, Hardy & Bacon L.L.P.

(57) ABSTRACT

Live migration of partitions can be achieved using server-to-server communications to coordinate and control partition migration and rebuild a persistent state of the partition on a destination server while the partition is served on the source server. The live migration approach breaks the heavy dependency on the partition master by eliminating most of the server-to-master communications, delegating coordination and control of the migration to the source and destination servers. After the migration is initiated by the partition master, the source server sends in-memory cache entries indicating the persistent state of the partition to the destination server. Once transferred, the two servers can cooperate to complete the handover, which loads the partition on the destination server using the cache entries received from the source server. Once the source server offloads the partition, it can redirect traffic for the partition to the destination server by triggering an update to the partition map.

20 Claims, 7 Drawing Sheets

(56) References Cited

U.S. PATENT DOCUMENTS

2014/0108350 A1* 4/2014 Marsden ................ H04L 69/40
707/639

* cited by examiner

LIVE MIGRATION OF PARTITIONS

BACKGROUND

Distributed computing environments are computing architectures that support network access to a shared pool of configurable computing and storage resources. A distributed computing environment can be implemented with user files, structured storage, and message delivery to support building, deploying, and managing applications and services. An increasing number of users and enterprises are moving away from traditional computing architectures to run their applications and services on distributed computing environments. As such, distributed computing environments are faced with the challenge of supporting the increasing number of users and enterprises sharing the same computing resources. In a distributed computing environment that assigns key-ranges to partitions, partitions can be moved around different servers for load balancing and/or software upgrades.

SUMMARY

Embodiments described herein provide methods and systems for live migrations of partitions from a source server to a destination server. At a high level, a partition server serving a partition stores the persistent state of the partition in an in-memory cache. A coordinator such as a partition master triggers a live migration by informing the relevant source and destination servers. Informing the relevant source and destination servers delegates control of the live migration to the source and destination servers, which coordinate and perform the live migration using point-to-point (P2P) communications with each other. The source server stops all destructive operations that would invalidate the persistent state stored in its in-memory cache, or that would invalidate an open connection (e.g., handle) to a location for the partition in persistent storage. The source server pushes the cached persistent state to the destination server, which stores the persistent state in its own in-memory cache. Because the source server has stopped destructive operations, the destination server can use the persistent state to perform some disk operations to prepare to load the partition, such as opening up a connection (e.g., handle) to a location for the partition in persistent storage. As such, when the time comes for the destination server to load the partition, it no longer needs to look up the persistent state or perform the preparatory disk operations it previously performed.

In some embodiments, the source server can log transactions for the partition that occur after it stops destructive operations, and store them in a separate in-memory cache. Once the source server finishes transferring the original persistent state, the source server may transfer the logged transactions. To facilitate transferring the logged transactions, the source server may make a determination whether the size of the logged transactions exceeds some threshold size (e.g., 4 MBs). If so, the source server can stream the logged transactions, and repeat the process until the size of the remaining cache does not exceed the threshold. In this manner, the source server can determine that the live migration is completed, stop serving the partition, inform the destination server that the partition is being offloaded, and inform the partition master that it has offloaded the partition. When the destination server is informed by the source server that the partition is being offloaded, the destination server uses the preparatory disk operations to load the partition, begin serving it, and informs the partition master that it has begun serving the partition.

When the partition master is informed that the live migration is complete (whether by the source server, the destination server, or both), it can initiate an update to a partition map indicating the assigned partition server for the partition. However, in some embodiments, a separate front end element may have a stale version of the partition map, and may route incoming traffic for the partition to the source server, even though the source server has it stopped serving traffic for the partition. As such, the source server can be configured to respond to such an incoming request with a response identifying the destination server, its location, or some other indication that future requests for the partition should be directed to the destination server. This response can trigger the front end component to update its copy of the partition map so future incoming requests are properly routed.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

In a key-range based distributed computing system, the smallest unit serving a specific key range (e.g., a partition) can be assigned to and served by a particular server. Generally, a partition server (e.g., a table server) is responsible for serving requests to one or more ranges of partitions assigned to the server (e.g., by a coordinator such as a partition master, load balancer, etc.). The partition server can store a representation of the persistent state of an assigned partition in an in-memory cache of the partition server for efficiency. Partitions can be re-assigned and moved to different partition servers for various purposes, including load balancing, partition splits, partition mergers, server failures, software upgrades, and others. Generally, migrating a partition from a source server to a "destination" server involves offloading the partition from a "source" server and reloading it on the destination server.

Figure 1:
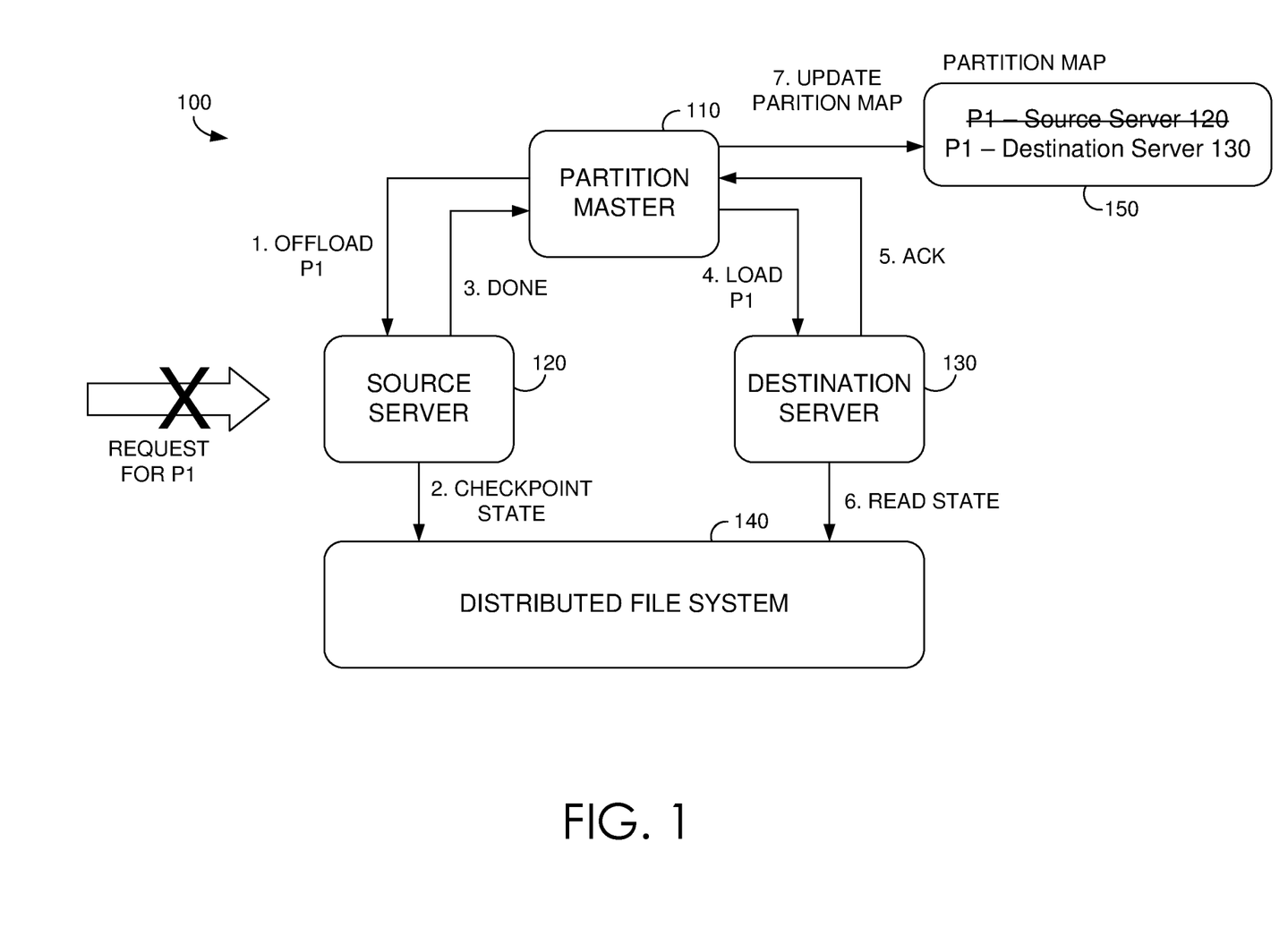
FIG. 1 is a block diagram of a prior migration system, in accordance with embodiments described herein.

One prior technique for migrating partitions can be understood with reference to FIG. 1. Distributed computing environment 100 includes partition master 110, source server 120, destination server 130, distributed file system 140, and partition map 150. Distributed file system 140 stores any number of partitions. Arabic numerals 1-7 illustrate steps of an example migration that changes which server serves a particular partition P1 stored in distributed file system 140, from source server 120 to destination server 130. First, partition master 110 sends a message to source server 120 informing the server to offload P1. Before offloading, source server 120 sends a command to P1 in distributed file system 140 to write a checkpoint of the latest state of P1, and stops serving requests for P1. Source server 120 then sends an acknowledgement to partition master 110 that it has completed the offload. At this point, P1 is unavailable. Since partition map 150 reflects that source server 120 is assigned to serve P1, incoming requests for P1 will be forwarded to source server 120. However, since source server 120 has offloaded P1, the incoming requests will fail.

Once source server 120 informs partition master 110 that is has offloaded P1, partition master 110 reassigns P1 to destination server 130. This is accomplished by partition master 110 sending a command to destination server 130 to load P1. In response, destination server 130 acknowledges the command and reads the latest state of P1 (which was just checkpointed) from distributed file system 140 to load P1. In response to receiving the acknowledgement from destination server 130, partition master 110 updates partition map 150 to reflect the reassignment of P1 to destination server 130. As such, incoming requests for P1 will be forwarded to destination server 130, and destination server 130 serves traffic for P1.

This prior technique for migrating partitions has various drawbacks. To ensure data consistency, after stopping traffic to a partition from a source server, traffic to the partition generally cannot be resumed before the partition is reloaded on a destination server. In this prior technique, reloading the partition on the destination server involves the destination server rebuilding the representation of the persistent state of the partition (referred herein simply as the persistent state) from disk and storing the persistent state in its own in-memory cache. The time spent reloading partitions contributes to most of the system's unavailability. For example, disk I/O operations performed by a server (e.g., reading the partition's data and other on-disk operations) can take seconds or even minutes (e.g., due to difficulty locating the read-start position of a stream). As such, resulting disk I/O operations can consume the majority of the time required to reload the partition. In some cases, reloading a partition can take longer, on the order of minutes to tens of minutes, if a corresponding disk or node is unavailable. In some worst cases, failover of a load balancer or other communication issue between the load balancer and the source or destination servers can also lead to a large downtime. At a result, the time in which a partition is unavailable impacts load balance efficiency.

Moreover, unavailability can impact end user experience. For example, a tenant running a virtual machine may experience a disk freeze, or a steaming video may not load (e.g., when the unavailability lasts longer than a client has buffered). These and other shortcomings exist with conventional methods for migrating partitions. As such, processes to support live migration of partitions are integral to efficient partition management, efficient load balancing, and an improved end user experience.

Embodiments described herein provide simple and efficient methods and systems for migrating a partition from a source server to a destination server while still serving the partition with the source server (live migration). At a high level, a live migration can be initiated by a partition master. The partition master can delegate coordination and/or control of the migration to the source and destination servers. This delegation can prevent unwanted delays that would otherwise occur when a partition master fails. As such, the source and destination servers can coordinate and perform the migration using point-to-point communications (P2P) with each other. These P2P communications can involve the source server sending data/entries from its in-memory cache to the destination server while the source server continues to serve the partition. For example, the source server can store the persistent state of the partition (e.g., key range being served, pointers or other metadata indicating where partition data for that key range is located, a log of transactions, a pointer or other metadata indicating where the transaction log is located, some other indication of a persistent storage state and transactions occurring after that state, etc.) in an in-memory cache for efficiency. Generally, by transferring the persistent state of the partition to the destination server, the time it takes the destination server to load the partition can be reduced. Previously, loading a partition involved reading persistent storage (e.g., to locate the active set of checkpoints) and replaying recent transactions to rebuild the partition state in-memory. Now, the source server can transfer the persistent state, or only the portion needed to load the partition, to the destination server during a live migration, and the destination server can store the persistent state in its in-memory cache. In this manner, the destination server no longer needs to read this information from persistent storage in order to load the partition. As a result, the destination server can load the partition faster than prior techniques.

In order to continue serving traffic to the partition during a live migration, and to communicate updates to the partition to the destination server, when the source server receives an instruction to migrate a partition, it can stop destructive operations (e.g., operations that would invalidate metadata, stream handles, garbage collection, otherwise change the partition state or invalidate a reload using the partition state, etc.), push the current state of the partition to the destination server, and stream any updates to the partition to the destination server. In this manner, the destination server will not need to read these updates from storage. Moreover, because the source server stops destructive operations that would change the state of the partition, the destination server can perform some disk operations to prepare to load the partition using the received information, while the source server continues to serve the partition. For example, the destination server can establish connections to persistent storage (e.g., opening stream handles relating to the partition) using locations identified in the received partition state, fetch metadata using those connections, and the like. All of this can occur while the source server continues to serve the partition. As a result, the time in which the partition is unavailable is reduced from prior techniques.

Once the source server finishes transferring data to the destination server, the source server can release the partition to the destination server and inform the partition master that it has finished offloading the partition. However, traffic for the partition may still be routed to the source server. In some embodiments, traffic for the partition can be redirected by the source server. For example, once the source server releases the partition, the source server can be configured to reply to incoming requests for the partition with a response that indicates the new server for the partition (the destination server). This response can trigger an update of a partition map so that future requests for the partition are directed to the destination server. Since the time it takes the destination server to load the partition is substantially reduced, there is a high probability that the destination server will be ready to serve the partition by the time a subsequent request is directed to the destination server. The net effect of techniques described herein is that the time during which a partition is unavailable is substantially reduced over prior techniques.

As such, live migration of partitions can be achieved by using server-to-server communications to perform partition migration and rebuild a partition state on the destination server while the partition is served on the source server. Compared to old reload logic, the present migration approach breaks the heavy dependency on the partition master by eliminating most of the server-to-master communications, delegating coordination and control of the migration to the source and destination servers. After the migration is initiated by the partition master, the source server sends in-memory cache entries representing the persistent state of the partition (e.g., for metadata and/or log streams) to the destination server. When all of the partition's in-memory cache entries are transferred, the two servers can cooperate to complete the handover, which loads the partition on the destination server using the cache entries received from the source server. Once the source server offloads the partition, it can redirect traffic for the partition to the destination server by triggering an update to the partition map.

It is contemplated that techniques described herein may be used in other operating environments or operational contexts. By way of example, a database application may provide database services to other computer programs in a client server models. Such an implementation may include a controller component that supports a first component and second component that process files for the database application. Periodically, the database application may have to migrate or split an existing file group into multiple data files, for example, from the first component (i.e., the source component) to the second component (i.e., destination component) supported by the controller component (i.e., master component. As such, the techniques described herein can be implemented with the data application components. In particular, the controller component delegates coordination and control of the migration to the first and second components. After the migration is initiated by the controller component, the first component sends cache entries representing the persistent state of the data files (e.g., SQL transactions) to the second component. When all of the second component cache entries are transferred, the two components can cooperate to complete the handover, which loads the data files on the second component using the cache entries received from the first component. Once the first component offloads the data files, it can redirect traffic for the data files to the second component by triggering an update to the controller component.

As such, techniques described herein reduce reload time and the time in which partitions are unavailable when compared with prior techniques. Moreover, by reducing the dependency upon the partition master, partition migration can be accomplished even during a failover of the partition master, thereby improving the robustness of partition movements over prior techniques. Further, in the event the partition master goes down, techniques described herein can prevent partitions from being unserved at any given time. In embodiments which are implemented in a distributed computing environment, live migration can occur while providing consistency and transactional guarantees unique to distributing computing. In this manner, techniques disclosed herein facilitate improved efficiencies in partition management and load balancing, and an improved end user experience.

Exemplary Live Migration Environment

Figure 2:
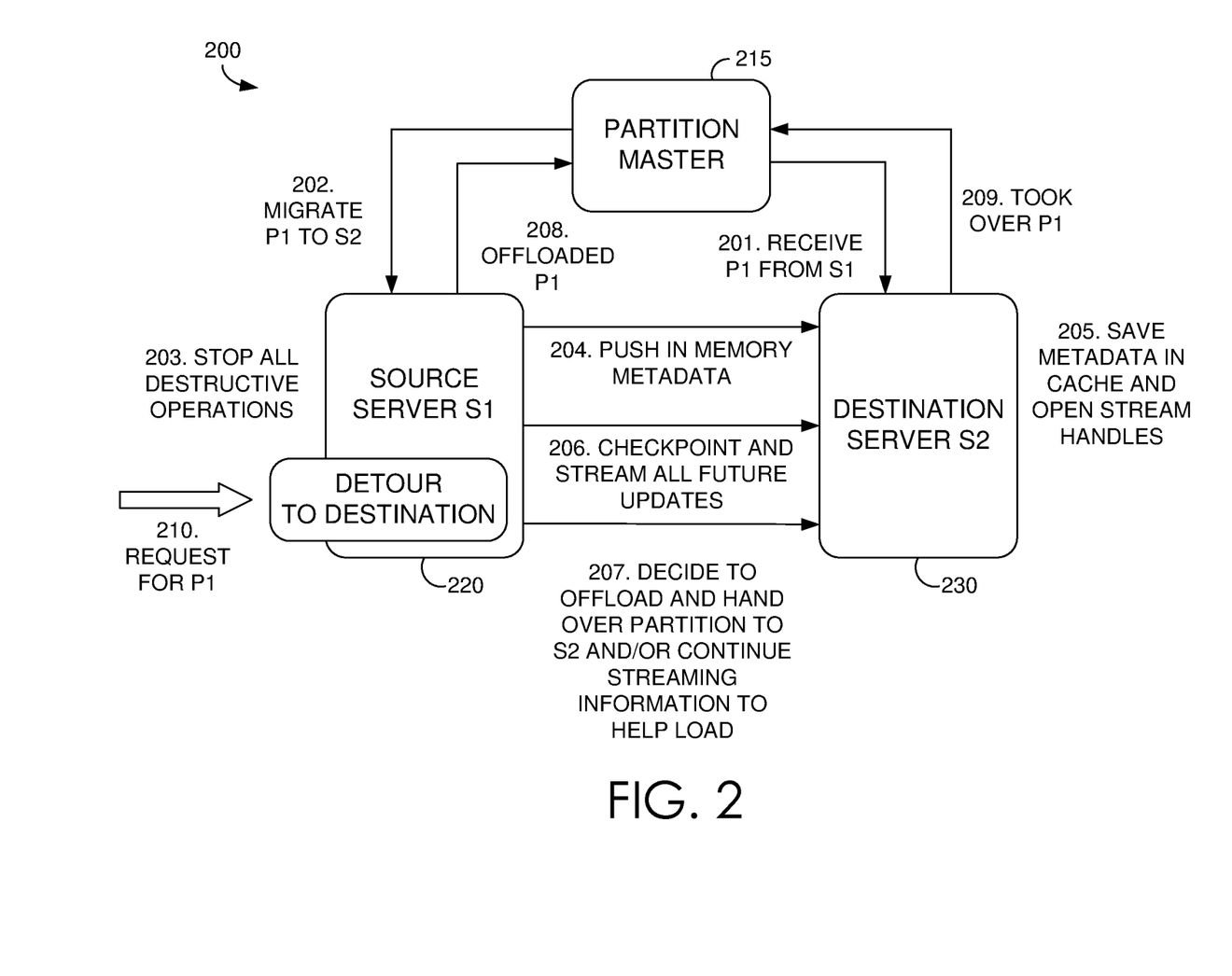
FIG. 2 is a block diagram of an exemplary live migration system, in accordance with embodiments described herein.

Referring now to FIG. 2, a block diagram of exemplary environment 200 suitable for use in implementing embodiments of the invention is shown. Generally, environment 200 is suitable for live migration of partitions. For example, environment 200 may, but need not, be implemented in a distributed computing environment that facilitates migrating a partition from a one partition server to another, while serving the partition. Various implementations are possible. By way of nonlimiting example, environment 200 may be implemented using a multi-layered architecture that facilities access to a distributed file system. One such example is depicted below with respect to FIG. 5, which includes a front-end layer, a partition layer, and a stream layer. As explained in greater detail below, the stream layer operates as a distributed file system which manages files (e.g., streams) and blocks of data (e.g., extents), and the partition layer operates manage higher level abstractions to store data on top of the stream layer. This particular configuration may be used for illustration purposes herein, however, the present techniques are not limited to these particular layers, files, or data structures. More generally, environment 200 may be any computing environment capable of facilitating load balancing (e.g., storage systems, databases, etc.).

Environment 200 includes partition master 215, source server 220, and destination server 230. Each of these components can be any kind of computing device capable of facilitating serving and/or live migration of a partition. For example, in an embodiment, partition master 215, source server 220, and destination server 230 can each be a computing device such as computing device 700, as described below with reference to FIG. 7. In embodiments, partition master 215, source server 220, and destination server 230 can each be a personal computer (PC), a laptop computer, a workstation, a mobile computing device, a PDA, a cell phone, or the like. Additionally and/or alternatively, one or more of partition master 215, source server 220, and destination server 230 may be a service running on a computing device such as computing device 700. As discussed above, it is contemplated that techniques described herein may be implemented in other operating environments, as such, the partition master, source server, and destination server are provided as example components, and, for example, a database application having a controller component, a first component, and a second component, may perform operations of corresponding components of environment 200. The components of environment 200 may communicate with each other via a network, which may include, without limitation, one or more local area networks (LANs) and/or wide area networks (WANs). Such networking environments are commonplace in offices, enterprise-wide computer networks, intranets, and the Internet.

Live migration of a partition from one partition server to another can be implemented in various scenarios. Generally, a partition server (e.g., source server 220) can be assigned responsibility for serving requests to one or more partitions and/or one or more ranges of partitions. Partitions can be re-assigned (e.g., by a coordinator such as partition master 215) to a new partition server (e.g., destination server 230) for various purposes, including load balancing, partition splits, partition mergers, server failures, software upgrades, and others. In prior techniques, a partition master coordinated partition migrations, waiting for a source server to finish offloading a partition before the partition master informed a destination server to load the partition. As such, these prior techniques relied on a partition master to coordinate timing for offloading and loading a partition. By contrast, FIG. 2 depicts an embodiment in which partition master 215 initiates a live migration, but delegates control of the timing for offloading and loading the partition to source and destination servers 220 and 230.

In FIG. 2, reference numbers 201-210 illustrate steps of an example live migration performed by the components of environment 200. Initially at step 201, partition master 215 initiates a message indicating to destination server (S2) 230 that destination server 230 will be responsible for serving a partition (P1) and to expect to receive the persistent state of P1 from source server (S1) 220. This initial message from partition master 215 may accomplish various purposes. For example, destination server 230 can be configured to accept migration messages from a source server designated in the initial message for a partition specified in the initial message (e.g., only accepting migration messages from source server 220, only accepting migration messages about the specified partition, etc.). Destination server 230 may respond with an acknowledgement. In some embodiments, upon receiving the initial message from partition master 215, destination server 230 can be configured to enter a particular state and communicate the state back to partition master 215. In the event of a failover of partition master 215, knowledge of this state allows partition master 215 to re-build using this state. In some embodiments, destination server 230 does not yet take any action to pre-load the partition.

At step 202, partition master 215 initiates a message commanding source server (S1) 220 to migrate partition P1 to destination server (S2) 230, and source server 220 may respond with an acknowledgement. Before receiving this command, source server 220 stored a representation of the persistent state of partition P1 in an in-memory cache. The persistent state can be stored in the in-memory cache in various manners, and may include some representation of one or more of the following: key range being served, pointers or other metadata (e.g., a metadata stream) indicating where partition data for that key range is located (e.g., in a stream layer), a log of transactions (e.g., a commit log), a pointer or other metadata indicating where the transaction log is located, some other indication of a persistent storage state and transactions occurring after that state, etc. Upon receiving the command from partition master 215 to migrate P1, at step 203, source server 220 continues to serve P1, but stops all destructive operations that can invalidate the state of P1, that can invalidate any open connections/handles for P1, and/or that can invalidate a reload using the partition state (e.g., modifications for P1 in the file system, stream layer, etc.). For example, open handles may provide connections to a particular location for partition data (e.g., the end of a particular file). In this example, source server 220 stops performing operations that would change that location (e.g., an append operation) or otherwise invalidate the representation of the persistent state of P1 currently stored in its in-memory cache. Instead, source server 220 may record such modifications (e.g., log updates) in its in-memory cache (e.g., in a new cache for each log stream type). In this manner, live traffic for the partition goes through the new caches.

After stopping destructive operations, source server 220 and destination server 230 coordinate and perform the migration of P1 using point-to-point communications (P2P) with each other. At a high level, at step 204, source server 220 pushes the persistent state of partition P1 stored in its in-memory cache to destination server 230. At step 205, destination server 230 stores the persistent state in its own in-memory cache and begins opening handles. At step 206, source server 220 checkpoints and streams all future updates for partition P1 to destination server 230. Once completed, at step 207, source server 220 may determine that the migration is complete, offload the partition, and handover the partition to destination server 230. Steps 203-207 may be accomplished in any suitable order and using any suitable communication scheme. One example communication scheme between servers is described below and includes various types of migration messages, including handshake, data, complete, acks, and abort. Each migration message may include a MigrateID GUID unique to a particular migration to prevent old messages (e.g., delayed in network) generated by a previous migration for the same partition from being used during movement of a current partition. In one embodiment, server-to-server communication includes three phases: handshake, data transmission and complete.

Handshake (and an optional acknowledgment) establishes a communication channel and ensures both directions are clear. In some embodiments, once destination server 230 receives the handshake, destination server 230 starts a thread to pre-open partition P1's files (e.g., streams) and cache the handles. In some embodiments, source server 220 re-sends the handshake until receiving an ack, or deciding to abort, as discussed in more detail below.

After the handshake and/or acknowledgement, a conceptual channel between source and destination servers 220 and 230 is established, and source server 220 sends the persistent state of P1 (e.g., cached data/entries for P1's metadata stream and log streams) to destination server 230 as individual messages. The persistent state can be serialized and wrapped as data messages. For example, if partition P1's metadata stream cache and log stream cache are to be sent, for cache entries can be added to a data field of the message, for example, without exceeding a predefined threshold (e.g., 4 MB). Each message may include a unique sequence number (e.g., a checksum) which can be used for acknowledgement and re-transmission, if necessary. Destination server 230 may, but need not acknowledge data messages.

On the source side, in embodiments which utilize an ack, unless an ack message is received, source server 220 may not release the serialized message with the corresponding sequence number. Each un-acked message may be resent if its ack is not received after some predetermined time (e.g., 2*(average deserialization time+round trip time)). If an ack is still missing after several re-transmissions, source server 220 may abort. Additionally and/or alternatively, to control memory usage at source server 220 and the count of in-flight messages within network, source server 220 may pause if it has more than some predetermined number of un-acked messages (e.g., 20).

On the destination side, upon receiving a data message, the message may be deserialized, and the cache entries inserted into an appropriate in-memory cache of destination server 230 (e.g., a cache for a corresponding stream type). In some embodiments, destination server 230 may then acknowledge. Similarly, destination server 230 may even acknowledge duplicated data messages, since a previous ack have been lost and/or delayed. Destination server 230 may keep track of a smallest expecting sequence number and include it in every ack message to facilitate faster retransmission. For example, if source server 220 receives several ack messages with the same SmallestExpectedSequence, which source server 220 has already sent, source server 220 can decide to re-send the corresponding data message, even before waiting for an ack time out.

Determining whether cached data transfer is complete may depend on the cache being transferred (e.g., the persistent state of P1 vs. new caches for live traffic served since the migration began). For example, once the cached data for the persistent state of P1 is transferred (e.g., and acknowledged), a determination of whether or not to transfer the new caches may be based on an evaluation of the size of the logged transactions stored in the new caches. Generally, the size of the new caches may be proportional to the amount of data destination server 230 would otherwise need to read from the file system (e.g., the stream layer) to load the partition. For example, if the total size of the new caches is under a predetermined threshold (e.g., 4 MB), source server 220 may decide to continue to the completion stage. Otherwise, source server 220 may transfer the new caches, repeating the process above (e.g., transferring the caches and routing subsequent live traffic through separate, new cache (s) in-memory).

Once a determination to continue the completion stage has occurred, to complete the migration, source server 220 stops serving requests to P1, and may initiate an update to its assignment (e.g., stored in XLock) and/or send a "complete" message to destination server 230. Upon receiving the complete message, destination server 230 may respond with an acknowledgement. Upon transmitting the acknowledgement, destination server 230 can begin loading the partition. In some embodiments, source server 220 re-sends the complete message until it receives an ack, or decides to abort, as explained in more detail below. Upon receiving the acknowledgement, at step 208, source server 220 releases the partition.

During a live migration, any of partition master 215, source server 220, and/or destination server 230 may decide to abort the migration. For example, in some embodiments, source server 220 and destination server 230 may report their respective migration state (e.g., to partition master 215) on heartbeats. Partition master 215 can decide to abort the migration when it identifies worsening situations on source server 220 (e.g., request timeout/latency), the migration takes too long (e.g., exceeds some predetermined time limit), etc. To accomplish this, partition master 215 may send an "abort" message to source and destination servers 220 and 230. Additionally and/or alternatively, partition master 215 may send an offload command to source server 220 (or a corresponding message to destination server 230) to indicate to the corresponding server to abort any ongoing migration. Upon receiving an "abort" from partition master 215, source and destination servers 220 and 230 can reset the designated partition's migration status and release the memory held for the migration. As such, any pending message in network can be ignored by source and destination servers 220 and 230.

Additionally and/or alternatively, the source and/or destination servers may be configured to abort a live migration. In prior systems, there can sometimes be a grey area for the health of a node where the node heartbeats, indicating it is online, but the node is nevertheless unhealthy (e.g., slow performing due to a hardware issue, thermal issue, etc.). In prior systems, there was no way to discover the unhealthy node until loading the partition on the destination server beginning to serve the load, and observing slow performance on the server. To provide a measure of the health of the destination server before loading a partition, source server 220 may monitor the average throughput of the server-to-server channel and/or message acknowledgement time-outs.

For example, various embodiments involve destination server 230 performing various tasks (e.g., fetch metadata, cache some things, open stream handles, etc.) before source server 220 decides to offload. Source server 220 may use a timer to measure the time it takes destination server to perform some or all of these tasks. For example, if the time between steps 202 and 207 of FIG. 2 exceeds some predetermined threshold (e.g., 15 seconds, 30 seconds, etc.), this may be taken as an indication that destination server 230 cannot complete its tasks within the designated time, and source server 220 can abort, inform partition master 215, and partition master 215 can reassign the partition to a new server. Other nonlimiting examples for abort criteria can include a determination that a recent average RTT exceeds some predetermined duration (e.g., 100 ms), a particular message's acknowledgement times out after x re-transmissions, etc. On the other hand, destination server 230 may be configured to abort when it discovers a corresponding scenario (e.g., the rate of receiving messages from source server 220 is low, waiting for a new message takes longer than a predetermined threshold, etc.).

Upon making a determination to abort, the server making the decision may send an "abort" message to its partner. In some embodiments, there is no need for an "abort-ack". In some embodiments, if subsequent messages are received from the partner, the server that decided to abort may respond to each subsequent message with an abort. Additionally and/or alternatively, subsequent messages can be ignored until the partner effectively notices the abort based on the extended silence.

Once a migration is complete (e.g., the partition has been offloaded from source server 220, the partition has been loaded onto destination server 230, and partition master 215 has been informed at steps 208 and 209), partition master 215 can update the partition map. However, in some embodiments, environment 200 includes a front end (not depicted in FIG. 2) that forwards incoming messages for the partition based on a locally cached copy of the partition map. In a prior technique, after a partition is reloaded on a new server, its traffic is not immediately redirected to the new one. Instead, upon a request failure returned from the old server, the front end requests a refresh of its partition map (e.g., from partition master 215). However, the roundtrip between the front end and partition master 215 often takes seconds.

As such, some embodiments implement a fast traffic redirection in a front end layer. Generally, source server 220 may store the destination for a partition (e.g., an indication of destination server 230, its location, etc.) upon receiving a communication from partition master 215 triggering a live migration (e.g., at step 202). Once the migration is complete, at step 210, the front end may still route requests for the partition to source server 220. If a request for the partition reaches source server 220 after the partition is already released (e.g., but the partition is in the process of loading onto destination server 230), source server 220 may fail the request and respond with an indication of the partition's new location (e.g., an indication of destination server 230 or its location). Upon receiving the response, the front end can redirect the next retry to the new server. In some embodiments, subsequent retries to destination server 230 may fail until it completes reloading the partition. In this scenario, the front end may be configured to continue retrying to give destination server 230 enough time to complete the reload.

Using techniques described herein, live migration of partitions can be achieved by using server-to-server communications to perform partition migration and rebuild a partition state on the destination server while the partition is served on the source server. The present approach improves on prior techniques in various ways. For example, because the persistent state of a partition to be migrated is transferred from a source to a destination partition server, the destination server no longer needs to read this information from storage, speeding up processing times. Similarly, because the destination server can perform some operations to prepare to load the partition (e.g., opening up stream handles) using this received cached data before actually loading the partition, the time in which the partition will be unavailable is reduced. Moreover, by allowing the partition master to delegate coordination and/or control of the migration to the source and destination servers, the present migration approach facilitates partition migration even during a failover of the partition master and can prevent partitions from being unserved at any given time. In this manner, techniques disclosed herein facilitate improved efficiencies in partition management and load balancing, and an improved end user experience.

Exemplary Flow Diagrams

Figure 3:
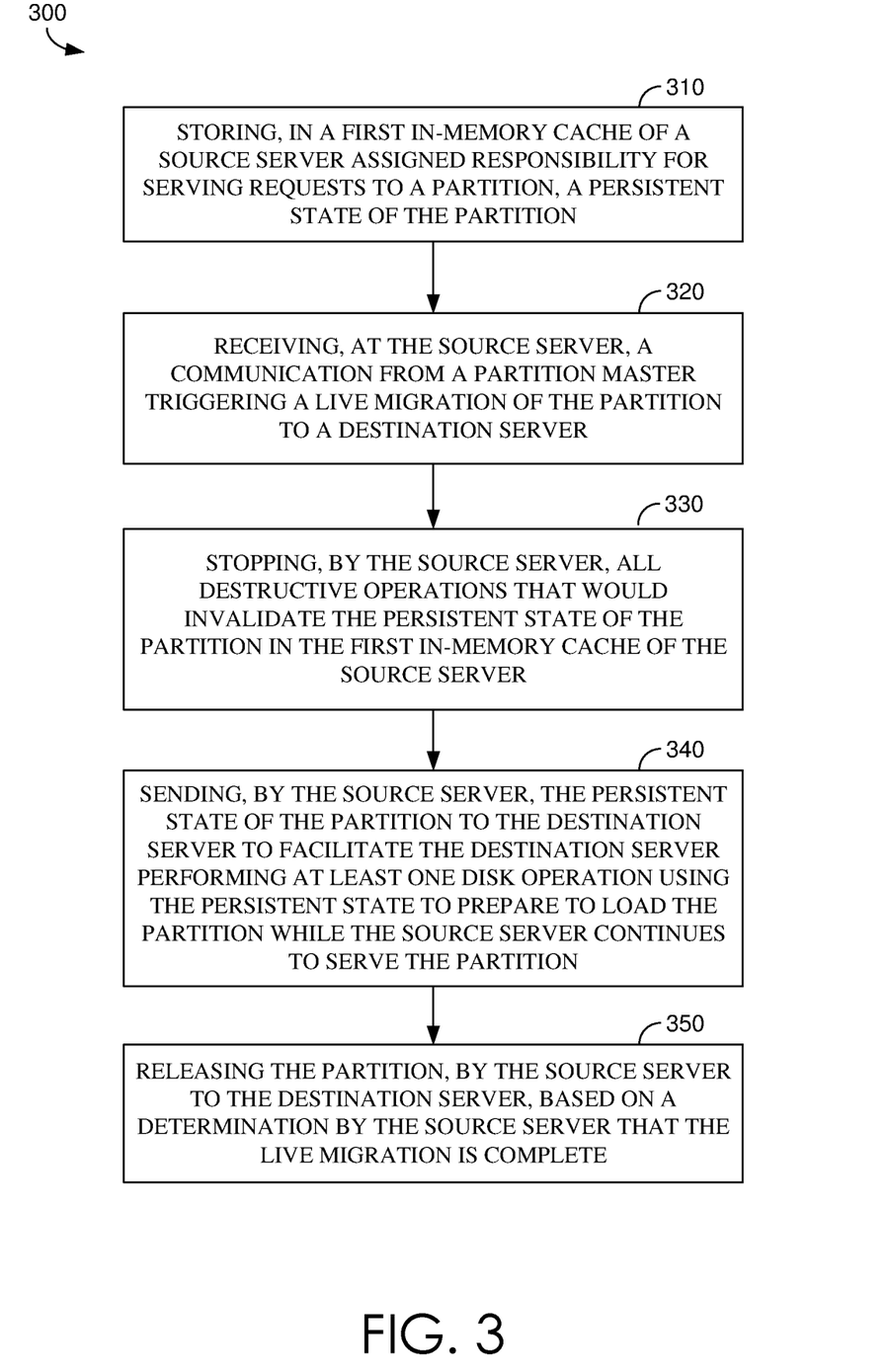
FIG. 3 is a flow diagram showing an exemplary method for live migration of partitions, in accordance with embodiments described herein.
Figure 4:
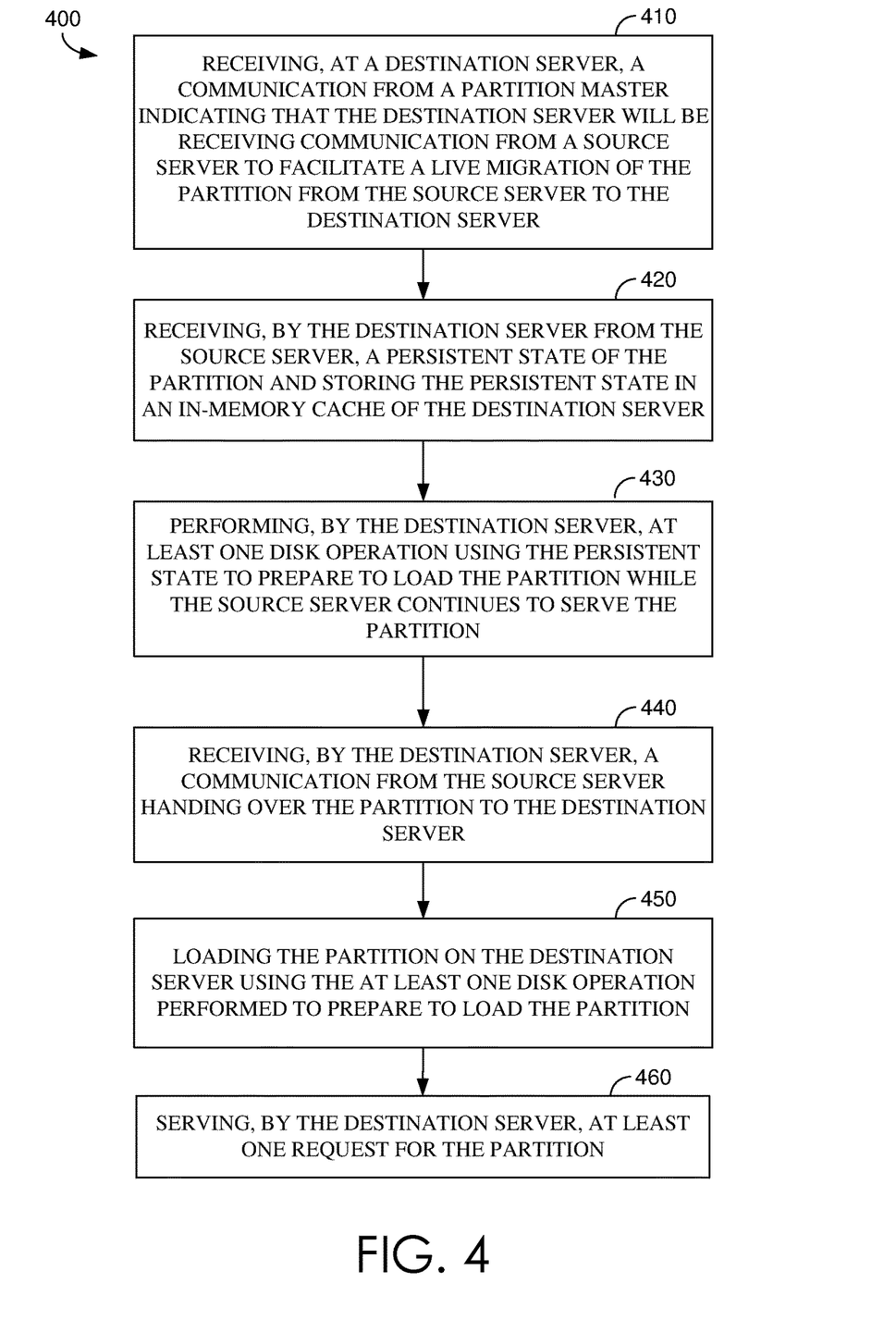
FIG. 4 is a flow diagram showing an exemplary method for providing live migration of partitions, in accordance with embodiments described herein.

With reference to FIGS. 3 and 4, flow diagrams are provided illustrating methods for live migration of partitions from a source server to a destination server. The methods can be performed using the live migration system described herein. In embodiments, one or more computer storage media having computer-executable instructions embodied thereon can, when executed by one or more processors, cause the one or more processors to perform the methods in the live migration system.

Turning now to FIG. 3, a flow diagram is provided that illustrates a method 300 for live migration of partitions. Initially at block 310, a persistent state of a partition is stored in a first in-memory cache of a source server assigned responsibility for serving requests to the partition. At block 320, a communication is received at the source server from a partition master triggering a live migration of the partition to a destination server. At block 330, the source server stops all destructive operations that would invalidate the persistent state of the partition in the first in-memory cache of the source server. At block 340, the source server sends the persistent state of the partition to the destination server to facilitate the destination server performing at least one disk operation using the persistent state to prepare to load the partition while the source server continues to serve the partition. At block 350, the source server releases the partition to the destination server based on a determination by the source server that the live migration is complete.

Turning now to FIG. 4, a flow diagram is provided that illustrates a method 400 for live migration of partitions. Initially at block 410, a destination server receives a communication from a partition master indicating that the destination server will be receiving communication from a source server to facilitate a live migration of the partition from the source server to the destination server. At block 420, the destination server receives from the source server a persistent state of the partition and stores the persistent state in an in-memory cache of the destination server. At block 430, the destination server performs at least one disk operation using the persistent state to prepare to load the partition while the source server continues to serve the partition. At block 440, the destination server receives a communication from the source server handing over the partition to the destination server. At block 450, the destination server loads the partition using the at least one disk operation performed to prepare to load the partition. At block 460, the destination server servers at least one request for the partition.

Exemplary Distributed Computing Environment

Figure 5:
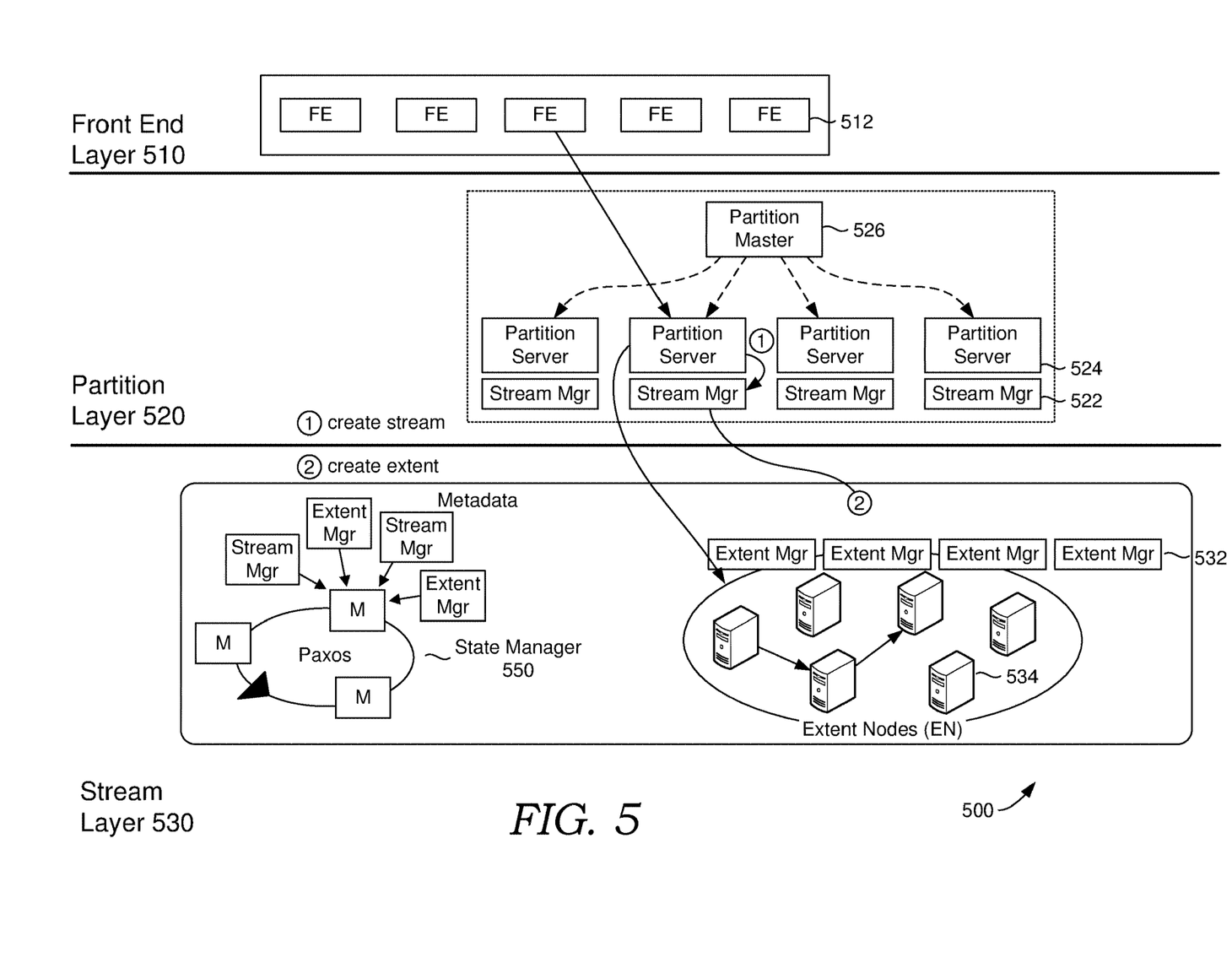
FIG. 5 is a block diagram of a distributed storage system in which embodiments described herein may be employed.

With reference to FIG. 5, by way of background, a distributed computing system 500 can include components that support distributed data synchronization. In particular, a front-end layer 510, a partition layer 520, and a stream layer 530, can be components of the distributed computing system 500. The distributed computing system 500 can include a front-end (FE) layer 510 having front end-servers (e.g., front server 512); a partition layer 520 having a partition master 526, partition servers (e.g., partition server 524) and stream managers (e.g., stream manager 522); and a stream layer 530 having extent nodes (ENs) (e.g., EN 534); extent managers (e.g., extent manager 532). The stream layer can include a state manager 550 for distributed management of stream and extent metadata.

In some embodiments, the state manager 550 can be implemented based on a distributed computing system (not shown) operating with the stream layer 530. Extents and streams can be partitioned and managed by many distributed extent managers and stream managers. The partition layer 520 can use the extent managers and stream managers to create user extents and user streams, for persisting customer data. An extent manager and stream manager can persist their own data in distributed computing system 500 system extents and system streams. System extents and system streams are managed by the state manager (not shown). The state manager 250 (or a bootstrap layer state manager 150) operates with extent managers and stream managers to manage system extents and systems streams.

The distributed metadata stream layer 530 is distributed to scale out while maintaining highly availability and strong consistency of the metadata in the distributed storage system. The distributed metadata stream layer 530 operates in a coordinated manner with the partition layer 520. The distributed stream metadata and extent metadata are implemented based on the distributed metadata stream layer 530 imposing system restrictions which impact the partition layer in order to leverage the distributed metadata stream layer 530 efficiently. In this regard, the partition layer 520 can also be optimized to facilitate metadata management in the distributed metadata stream layer 530. The design and architecture includes considerations for both the distributed metadata stream layer 530 and the partition layer 520. The distributed computing system 500 can provide a namespace and stores data by partitioning all of the data objects within a storage cluster. The front-end layer 510 can consist of a set of stateless server that take incoming requests. A detailed discussion of a suitable architecture of the distributed storage system for performing embodiments described herein is further described in U.S. application Ser. No. 15/080,465 filed Mar. 24, 2016 and entitled "DISTRIBUTED METADATA MANAGEMENT IN A DISTRIBUTED STORAGE SYSTEM," which is incorporated herein, by reference, in its entirety.

Figure 6:
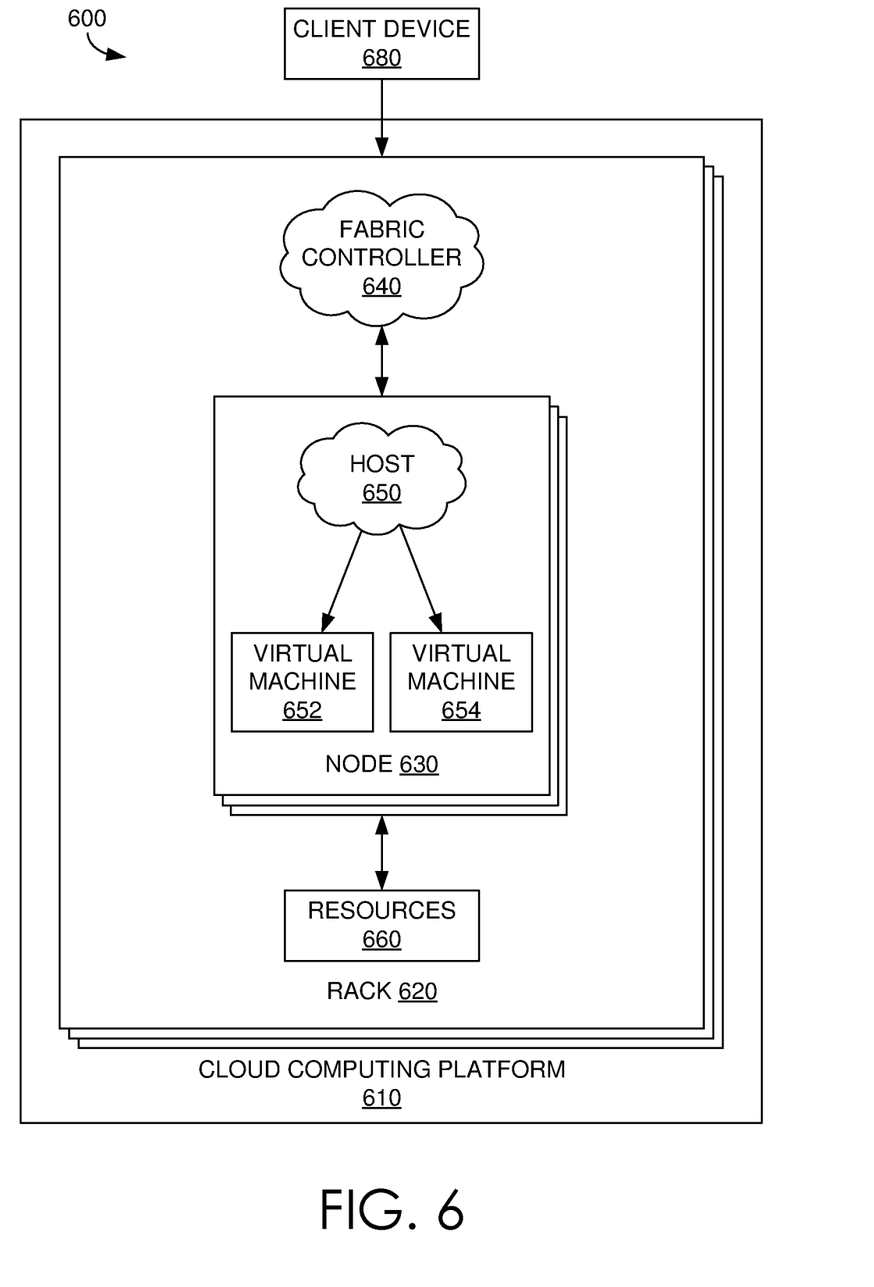
FIG. 6 is a block diagram of a computing environment suitable for use in implementing embodiments described herein.

Referring now to FIG. 6, FIG. 6 illustrates an exemplary distributed computing environment 600 in which implementations of the present disclosure may be employed. In particular, FIG. 6 shows a high level architecture of the live migration system ("system") in cloud computing platform 610, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 600 that includes cloud computing platform 610, rack 620, and node 630 (e.g., computing devices, processing units, or blades) in rack 620. The system can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example. Client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Exemplary Operating Environment

Figure 7:
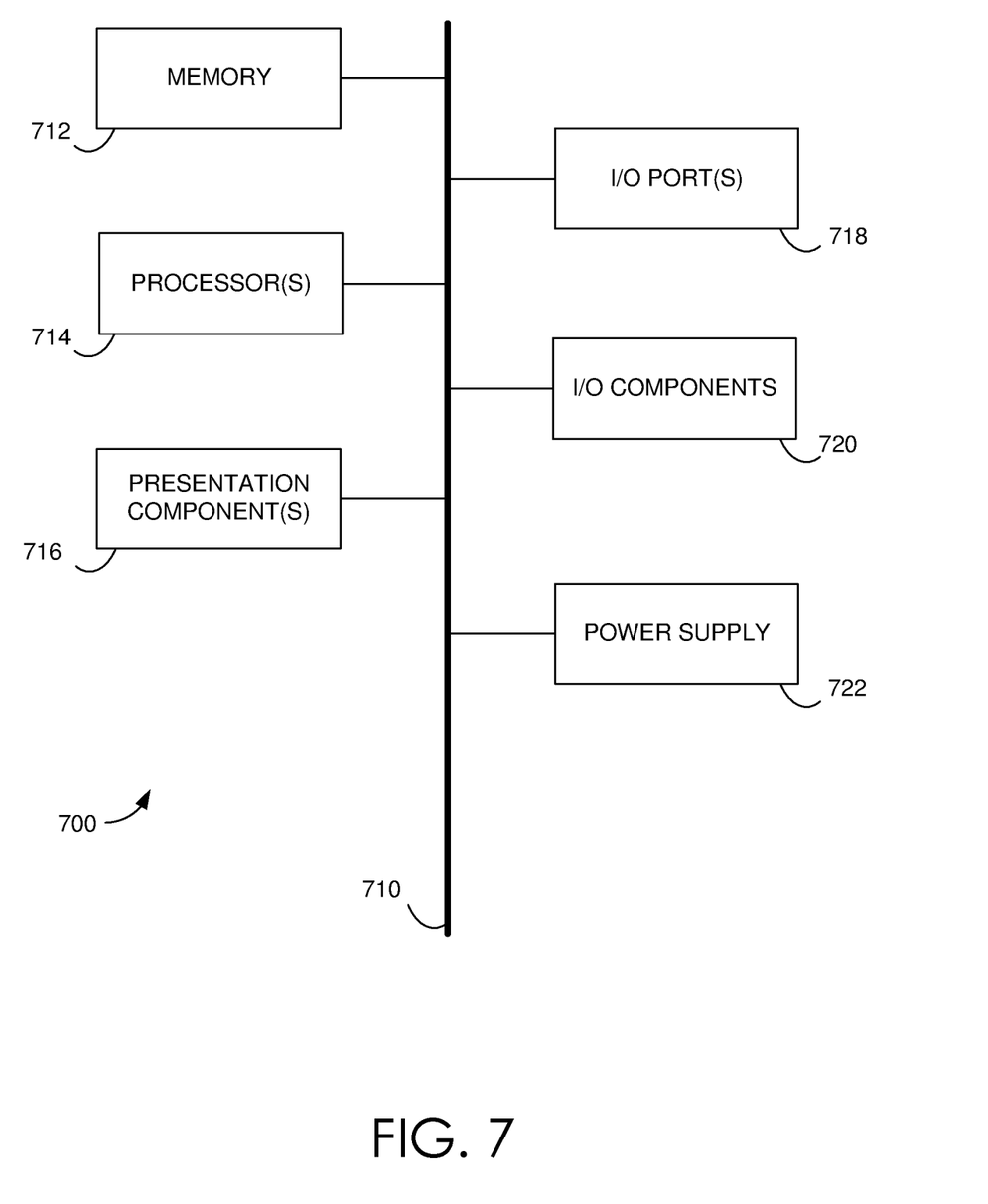
FIG. 7 is a block diagram of a computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 717, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the live migration system, embodiments described herein support live migration of partitions from a source server to a destination server. The live migration system components refer to integrated components for live migration. The integrated components refer to the hardware architecture and software framework that support live migration functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the live migration system can include an API library that includes specifications for routines, data structures, object classes, and variables may support the interaction between the hardware architecture of the device and the software framework of the live migration system. These APIs include configuration specifications for the live migration system such that the different components therein can communicate with each other in the live migration system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the words "informing" and "communicating" have the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the live migration system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method for live migration of partitions, the method comprising:
   storing, in a first cache of a source server assigned responsibility for serving requests to a partition, a representation of a persistent state of the partition;
   receiving, at the source server, a communication from a partition master triggering the live migration of the partition to a destination server;
   triggering, by the source server, the destination server to perform at least one preparatory disk operation to pre-load the partition, by sending the representation of the persistent state of the partition to the destination server while the source server continues to serve the partition; and
   releasing the partition, by the source server to the destination server, based on a determination by the source server that the live migration is complete.

2. The method of claim 1, further comprising:
   stopping, by the source server, one or more destructive operations that would invalidate the representation of the persistent state of the partition in the first cache of the source server;
   caching, in a second cache of the source server, transactions for the partition occurring after stopping the destructive operations; and
   streaming the transactions from the source server to the destination server.

3. The method of claim 2, wherein streaming the transactions is based on a determination by the source server whether to stream the transactions.

4. The method of claim 3, wherein the determination whether to stream the transactions is based on which of the caches is being transferred or a size of the transactions stored in the second cache.

5. The method of claim 1, further comprising the source server redirecting traffic for the partition to the destination server by replying to an incoming request for the partition with a response that indicates the destination server.

6. The method of claim 1, wherein the representation of the persistent state of the partition comprises a key range of the partition, pointers or other metadata indicating where partition data for the key range is located, a log of transactions, and a pointer or other metadata indicating where the transaction log is located.

7. The method of claim 1, wherein the at least one preparatory disk operation comprises establishing a connection to persistent storage for the partition, using a location identified in the representation of the persistent state, while the source server continues to serve the partition.

8. One or more computer storage media storing computer-useable instructions that, when used by one or more computing devices, cause the one or more computing devices to perform operations comprising:
   receiving, at a destination server, a communication from a partition master indicating that the destination server will be receiving communication from a source server associated with a live migration of the partition from the source server to the destination server;
   receiving, by the destination server from the source server, a representation of a persistent state of the partition, and storing the representation of the persistent state in a cache of the destination server;
   pre-loading the partition, by the destination server while the source server continues to serve the partition, by performing at least one preparatory disk operation using the representation of the persistent state;
   receiving, by the destination server, a communication from the source server handing over serving of the partition to the destination server;
   loading the partition on the destination server using the at least one preparatory disk operation; and
   serving, by the destination server, at least one request for the partition.

9. The one or more computer storage media of claim 8, the operations further comprising the destination server receiving from the source server, modifications to the partition occurring while the representation of the persistent state of the partition is being transferred.

10. The one or more computer storage media of claim 9, the operations further comprising receiving the modifications based on a determination whether to stream the modifications.

11. The one or more computer storage media of claim 10, wherein the determination whether to stream the modifications is based on which cache is being transferred or a size of the modifications.

12. The one or more computer storage media of claim 8, wherein the representation of the persistent state of the partition comprises a key range of the partition, pointers or other metadata indicating where partition data for the key range is located, a log of transactions, and a pointer or other metadata indicating where the transaction log is located.

13. The one or more computer storage media of claim 8, wherein the at least one preparatory disk operation comprises, before loading the partition, establishing a connection to persistent storage for the partition, using a location identified in the representation of the persistent state, while the source server continues to serve the partition.

14. The one or more computer storage media of claim 13, wherein the at least one preparatory disk operation further comprises fetching metadata using the connection while the source server continues to serve the partition.

15. A computer system comprising:
   a partition master configured to (a) inform a destination server that the destination server will be receiving communication from a source server to facilitate a live migration of a partition from the source server to the destination server; and (b) inform the source server to initiate the live migration;
   the source server configured to (a) store, in a first in-memory cache of the source server, a persistent state of the partition; (b) upon being informed to initiate the live migration (i) stop one or more destructive operations that would invalidate the persistent state of the partition in the first in-memory cache or an existing connection to persistent storage for the partition; and (ii) send the persistent state of the partition to the destination server while continuing to serve the partition; and (c) offload the partition to the destination server based on a determination by the source server that the live migration is complete; and the destination server configured to (a) receive the persistent state of the partition from the source server; (b) store the persistent state in a second in-memory cache of the destination server; (c) open at least one connection to the persistent storage for the partition, using the persistent state stored in the second in-memory cache, to prepare to load the partition while the source server continues to serve the partition; and (d) based on the source server offloading the partition to the destination server, loading the partition on the destination server using the at least one connection opened by the destination server to prepare to load the partition.

16. The computer system of claim 15, wherein the source server is further configured to:

log, in a third in-memory cache of the source server, transactions for the partition occurring after stopping the destructive operations; and stream the logged transactions from the source server to the destination server.

17. The computer system of claim 16, wherein the source server is configured to determine whether to stream the logged transactions based on a size of the logged transactions stored in the third in-memory cache.

18. The computer system of claim 15, wherein the source server is further configured to redirect traffic for the partition to the destination server, after offloading the partition, by replying to an incoming request for the partition with a response that indicates the destination server.

19. The computer system of claim 15, wherein the persistent state of the partition comprises a key range of the partition, pointers or other metadata indicating where partition data for the key range is located, a log of transactions, and a pointer or other metadata indicating where the transaction log is located.

20. The computer system of claim 15, wherein the destination server is further configured to fetch metadata using the at least one connection while the source server continues to serve the partition.

* * * * *